J. Jenkins,
Lifting Jack,
Nº 11,920. Patented Nov. 7, 1854.
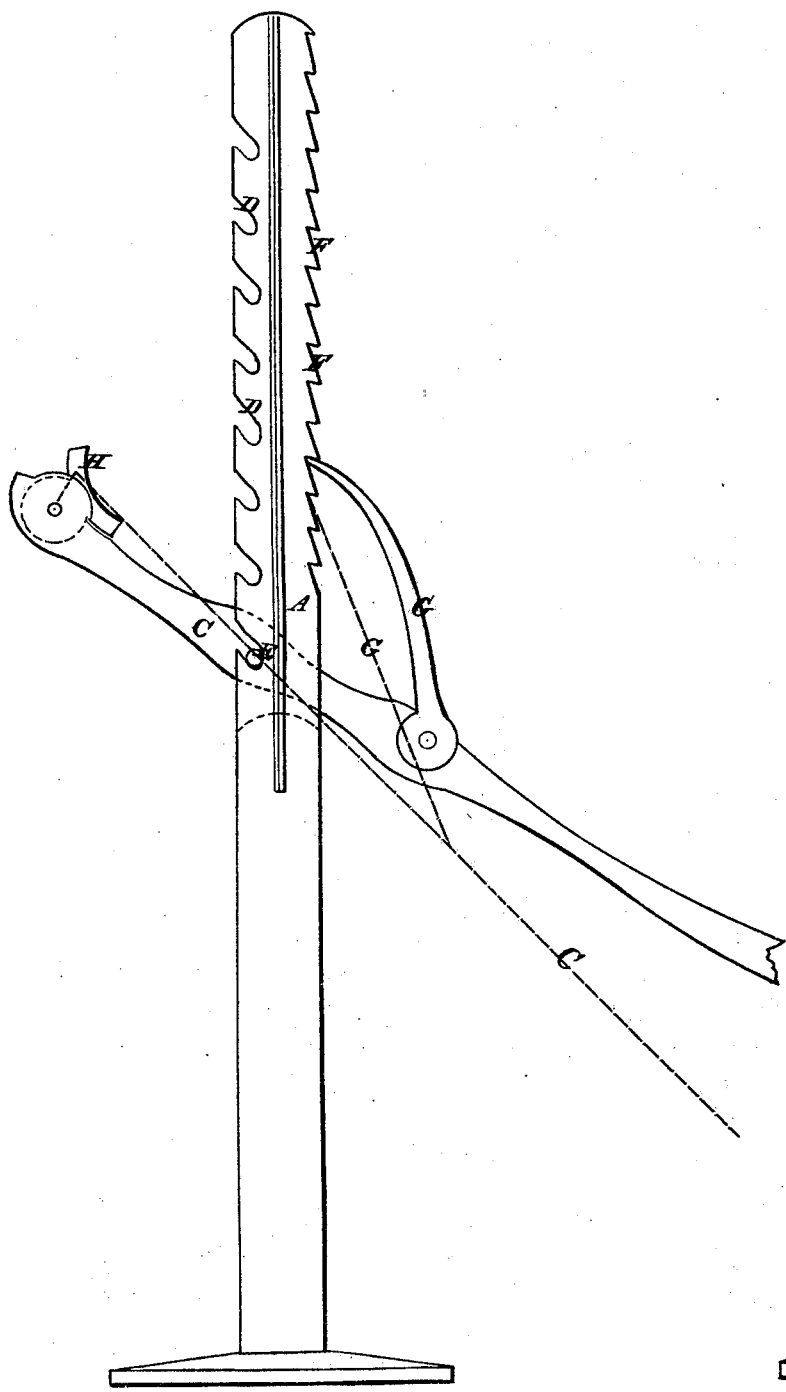
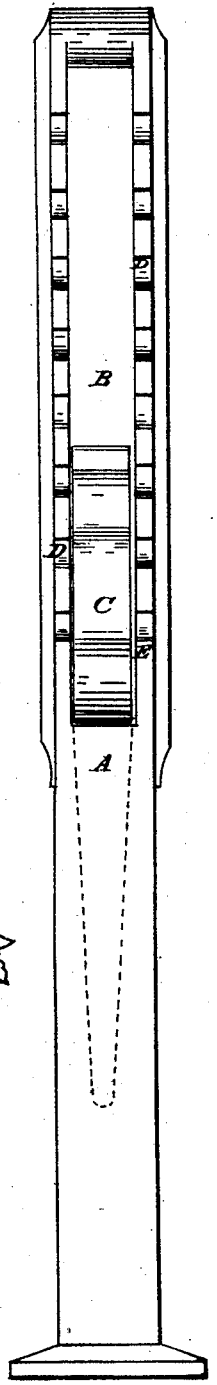

UNITED STATES PATENT OFFICE.

JOHN JENKINS, OF MONROE, NEW YORK, ASSIGNOR TO ROE, HORTON & CO., OF CHESTER, NEW YORK.

CARRIAGE-LIFTING JACK.

Specification of Letters Patent No. 11,920, dated November 7, 1854.

*To all whom it may concern:*

Be it known that I, JOHN JENKINS, of Monroe, in the county of Orange and State of New York, have invented a new and useful Improvement in Lifting-Jacks for Carriages; and I do hereby declare that the following is a full, clear, and exact description of the same, reference being had to the accompanying drawings, forming part of this specification, in which—

Figure 1, is a side elevation of a lifting jack, constructed after my plan. Fig. 2, is a front view of the same.

Similar letters of reference in each of the two figures indicate corresponding parts.

The nature of my improvement consists, in arranging the axle seat of lifting jacks, in such a manner that it will, no matter what may be the position or angle of the lifting lever, be capable always of assuming a horizontal position when the weight of the carriage comes upon it.

To enable others skilled in the art to make and use my invention, I will proceed to describe its construction and operation.

A, represents the standard; it has an oblong slot, B, cast in it, for the lever C, to play in, as it is operated and adjusted.

D, D, are the adjusting notches; they are made of such shape, that they serve as bearings for the fulcrum E, and confine the same sufficiently to prevent its escape while in operation. The fulcrum pin E, is secured fast in the lever, and turns in either pair of the notches D, D, as represented.

By thus employing a series of notches, the lever can be adjusted with great ease and facility, as may be desired.

F, designates the ratchet teeth, formed on the back side of the bar.

G, is the pawl which works in the same, as represented. By these ratchet teeth and pawl, the forward end of the lever can be adjusted so as to retain the carriage at any desired height—for by shifting the pawl from one tooth to another, the position of the forward end of the lever can be changed, as illustrated in red in Fig. 1.

H, is the axle seat or rest; it is made of a shape to correspond to that of the axle, and swings or vibrates on a center, as shown in the drawing. This seat, by being hinged, is rendered capable of assuming a horizontal position while the lever stands at an angle, and the weight of the carriage is resting upon it.

I do not claim a bar having teeth only on its back side, in combination with an adjustable fulcrum link, notched pawl, and lever, but

What I claim as my invention and desire to secure by Letters Patent, is:

The arrangement of the axle rest or seat H, substantially as, and for the purpose described.

JOHN JENKINS.

Witnesses:
WILLIAM SEAMAN,
OSCAR Y. BROOKS.